Dec. 28, 1965   G. F. WELLS   3,225,681
LIFT MECHANISM FOR DEEP FAT FRYERS
Filed March 21, 1960   4 Sheets-Sheet 1
FIG. 1
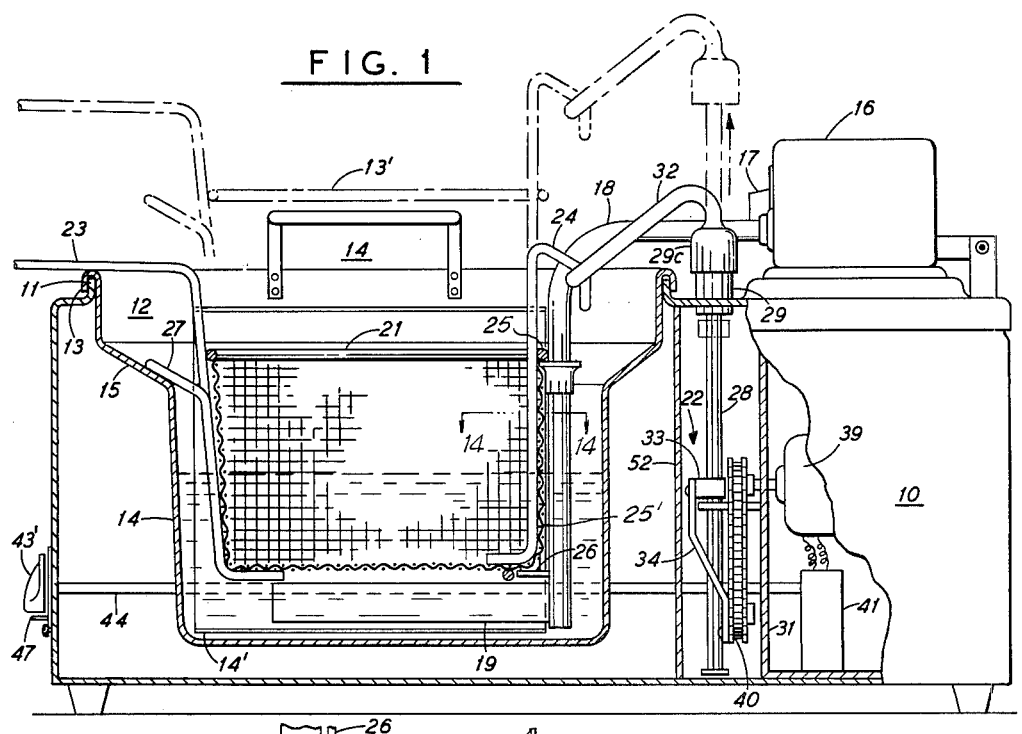
FIG. 2
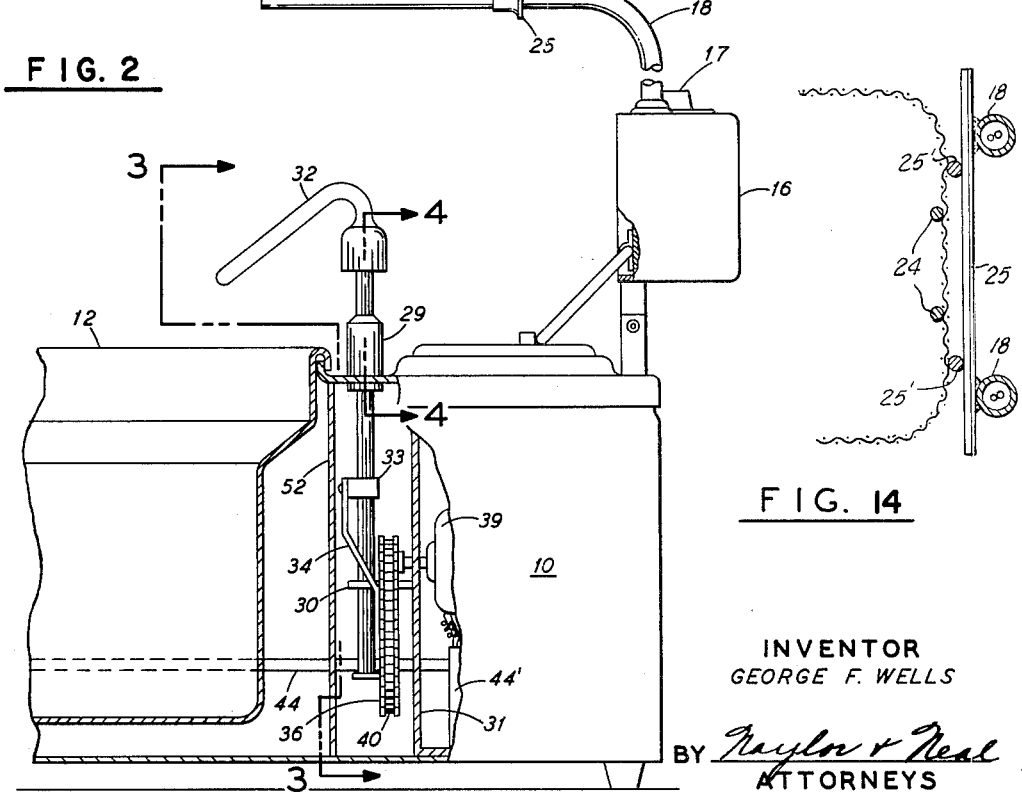
FIG. 14
INVENTOR
GEORGE F. WELLS
BY *Naylor & Neal*
ATTORNEYS Dec. 28, 1965  G. F. WELLS  3,225,681
LIFT MECHANISM FOR DEEP FAT FRYERS
Filed March 21, 1960  4 Sheets-Sheet 2
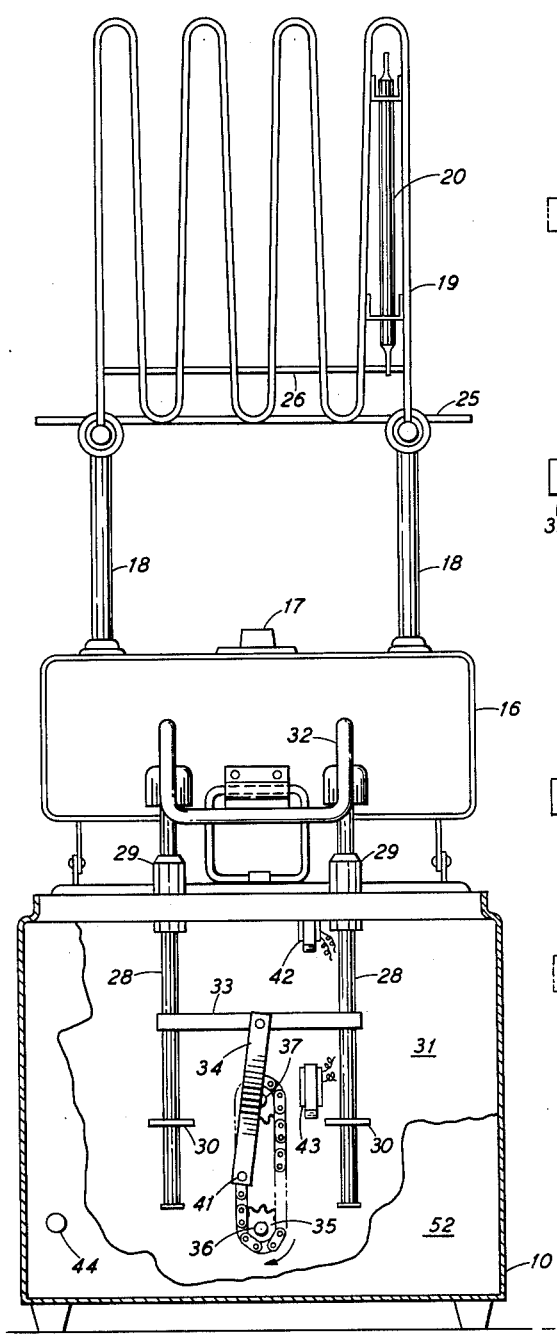
FIG. 3
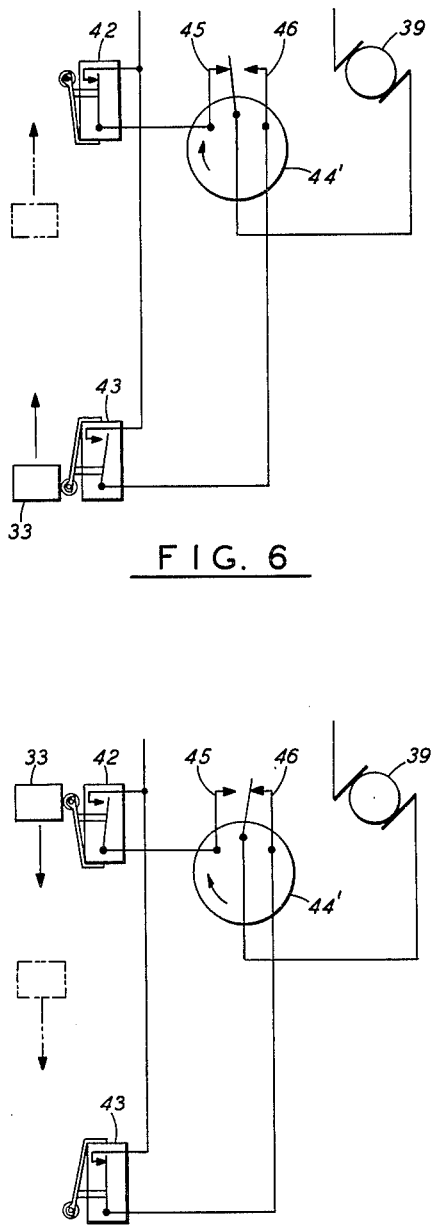
FIG. 6
FIG. 5
INVENTOR
GEORGE F. WELLS
BY *Naylor & Neal*
ATTORNEYS

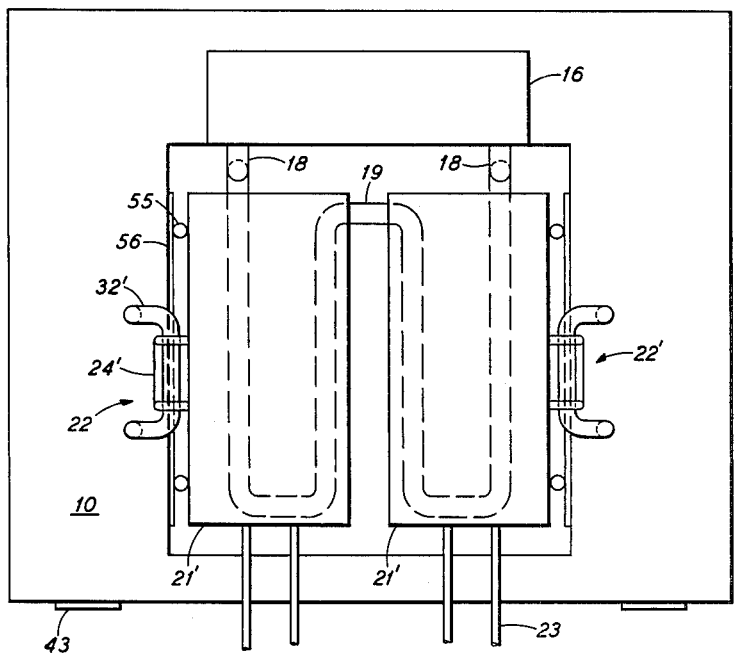
FIG. 9
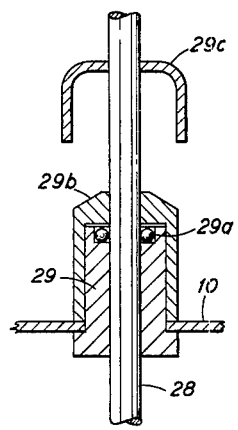
FIG. 4
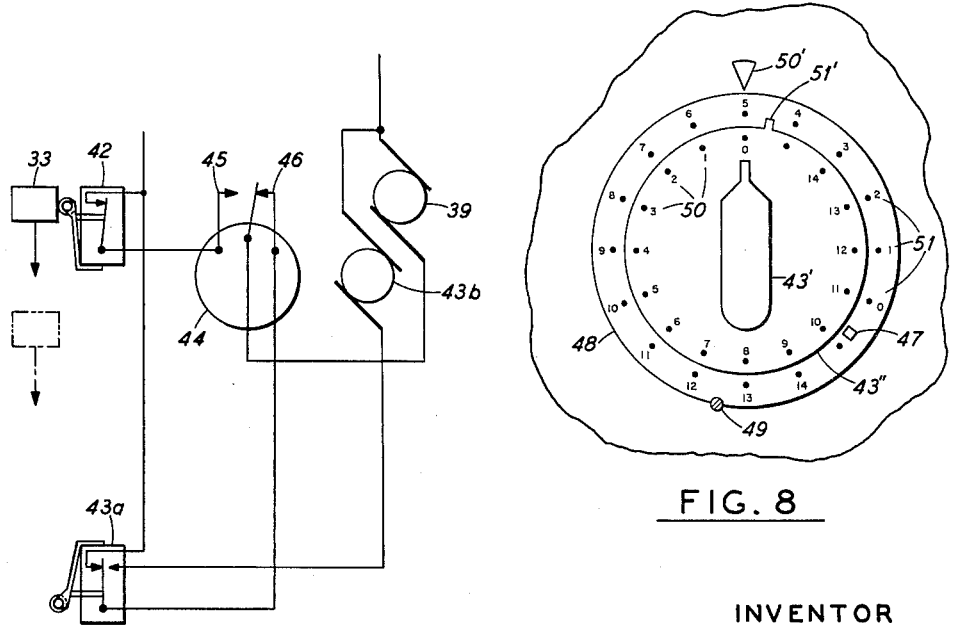
FIG. 8
FIG. 7
INVENTOR
GEORGE F. WELLS
BY Naylor & Neal
ATTORNEYS INVENTOR
GEORGE F. WELLS
BY *Naylor & Neal*
ATTORNEYS

United States Patent Office 3,225,681
Patented Dec. 28, 1965

3,225,681
LIFT MECHANISM FOR DEEP FAT FRYERS
George F. Wells, San Francisco, Calif., assignor to Wells Manufacturing Company, San Francisco, Calif., a corporation of California
Filed Mar. 21, 1960, Ser. No. 16,467
10 Claims. (Cl. 99—336)

This invention relates to automatic deep fat fryers, and more particularly to such automatic deep fat fryers in which articles of food may be placed in a foraminous basket and by a single manual manipulation the basket will be immersed in a bath of heated fat and removed from the bath after a predetermined period of time.

Automatic deep fat fryers are well known in the prior art, but have involved several serious faults in practical operation. Thus many of the prior art fryers have employed suspension systems for the foraminous basket which have permitted the basket to enter and leave the bath so rapidly that undue quantities of fat have been splashed from the bath; many involve impractical suspension systems for the basket which require driving motors of excessive power, and many of the control systems of the prior art permit undue wear on the equipment by permitting the basket moving controls to operate continuously even when the basket is in a stationary position for a substantial period of time. Fnally, many of the prior art devices employ parts which are subjected to extreme heat and are easily fouled by splashed fat from the heated fat bath, and the heating and fouling of such parts causes interruption in the operation of the machines.

Accordingly, it is a principal object of this invention to provide an automatic cooking machine in which a foraminous basket may be immersed in a bath of heated fat and removed from the bath after a predetermined period of time.

It is another object of the invention to provide such a machine in which the basket is supported and raised and lowered by positively connected elements which move smoothly through all operating cycles in order that the basket does not enter or leave the heated bath too abruptly.

It is another object of this invention to provide such a machine having a very efficient suspension system for raising and lowering the basket which system cannot be fouled by splashed fat and which includes a driving motor of minimum power.

It is a further object of the invention to provide such a machine in which the suspension and control elements for raising and lowering the basket are substantially at rest at all times that the basket is at rest.

It is a further object of the invention to provide such a machine in which the working parts thereof are isolated from the bath of heated fat to prevent their fouling and overheating.

It is a more specific object of the invention to provide such a machine in which an adjustable timer controls operation of a motor which lowers the basket into and raises the basket out of a cooking tank, and one or more limit switches are provided to stop the motor when the basket is at the extreme top and extreme bottom of its reciprocal cycle.

Other objects and advantages will become apparent from the following description of this invention read in conjunction with the attached drawings, in which:

FIGURE 1 is a side elevational view, partially in cross section, of a machine embodying the principles of this invention;

FIGURE 2 is a fragmentary view of the machine of FIGURE 1 in which the means for heating the fat bath have been rotated out of the bath and in which the foraminous basket has been removed from the bath and the basket lifting frame partially raised;

FIGURE 3 is a cross-sectional view of the apparatus of FIGURE 2 taken along the plane and in the direction indicated by the line and the arrows at 3—3 in FIGURE 2;

FIGURE 4 is a cross-sectional view of a part of the apparatus of FIGURE 2 taken along the plane and in the direction indicated by the line and the arrows at 4—4 in FIGURE 2;

FIGURE 5 is a diagram of the electrical control circuit for raising and lowering the basket in the machine of FIGURES 1-3, this diagram showing the condition of the circuit as a cooking cycle is started;

FIGURE 6 is a diagram of the circuit of FIGURE 4 showing the condition of the circuit as the basket is about to be lifted from the bath of heated fat;

FIGURE 7 is a diagram of an alternative form of the control circuit of FIGURE 5;

FIGURE 8 is a face view of the timer dial employed for actuating the control circuits of FIGURES 5-7;

FIGURE 9 is a top plan view of an alternative form of the apparatus of this invention;

FIG. 14 is a sectional view taken along the plane indicated at 14—14 in FIG. 1.

Figure 11:
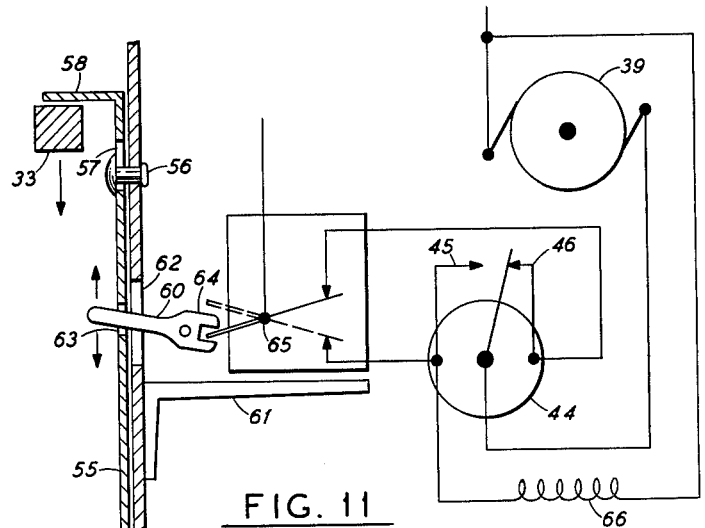
FIGURE 11 is a schematic diagram similar to FIGURE 7 illustrating an alternative form of the central means for the apparatus of this invention.

Referring now in detail to the drawings, a housing 10 is provided with an opening in the top thereof surrounded by an upwardly extending lip 11. A tank 12 is removably disposed in said opening and carries a curved lip 13 embracing lip 11. Tank 12 is provided with a pair of opposed handles 13' by which the tank 12 may be removed from housing 10, and tank 12 is also provided with a deep well portion 14 spaced inwardly from the periphery of tank 12 by a sloping portion 15, the latter permitting easy removal of tank 12 from housing 10 and serving to intercept and return fat splattered from well 14. A perforated crumb tray 14' extends from the sides of the tank 12 down into the bottom of well 14 to permit removal of crumbs from the fat bath without removal of the tank from the machine.

A control box 16 is pivotally mounted on housing 10 adjacent one side of tank 12 and carries a temperature control knob 17 thereon. Two tubular members 18 carrying insulated conductors lead from the control box 16 and extend generally vertically downwardly into the well 14 adjacent one wall thereof. The lower ends of the conductors are connected to a heating element 19 which carries a thermostat sensing unit 20 (see FIGURE 3). As is well known in the art, thermostat sensing unit 20 is connected to mechanism in control box 16 to supply electrical current to the conductors in members 18 whenever the fat in well 14 is colder than the temperature set on dial 17.

A foraminous basket 21 is removably disposed in well 14 and a frame, generally indicated at 22, is slidably mounted in housing 10 to support basket 21 and lower and raise it into and out of well 14. Basket 21 is provided with a handle 23 by which it may be lifted and a hook 24 on the opposite side of said basket from handle 23 and positioned to engage frame 22. A horizontal rod 25 is mounted on conductors 18 extending therebetween and positioned to engage the adjacent end of basket 21 supporting the latter in a horizontal position. The end of basket 21 is preferably provided with a pair of smooth vertical cams 25' to facilitate sliding of basket 21 on rod 25. A rod 26 is mounted near the lower end of members 18 and positioned to contact the lower edge of basket 21 supporting it above the top of heating coils 19. An inclined ear 27 is mounted on basket 21 on the side thereof remote from rod 25 and positioned so that contact of ear 27 with tank 12 and contact of rod 26 with the lower edge of basket 21 support basket 21 in a horizontal position in well 14.

Frame 22 comprises two vertical rods 28 slidably mounted in housing 10 by means of guideways 29 in the top of housing 10 and guides 30 mounted on a partition 31 in housing 10. As illustrated in FIGURE 4, each guide 29 is provided with an inner groove at the top thereof with an O-ring 29a compressed therein by a cap 29b which is swaged onto the top of guide 29 so that ring 29a prevents fat from being carried below housing 10 on rods 28. O-ring 29a is made of a suitable material such as neoprene which will resist deterioration from hot fat. A cap 29c is mounted on the upper part of each of rods 28 positioned to prevent fat from splashing directly on cap 29b when basket 21 is immersed in the hot fat. Rods 28 are connected at their upper ends by a U-shaped basket support loop 32 which extends downwardly toward tank 12 from the upper ends of rods 28. Loop 32 engages hook 24 on basket 21 and raises and lowers basket 21 as frame 22 is raised and lowered. Loop 32 lies on the side of conductors 18 and rod 25 remote from basket 21 so that as loop 32 is raised and lowered, it and rod 25 hold basket 21 in a horizontal position. The top surface of basket hook 24 is sloped downwardly from basket 21 toward loops 32 so that the slopes of hook 24 and ear 27 will cooperate to move basket 21 to the left as illustrated in FIGURE 1 in the event that loop 32 is moved downwardly when basket 21 is already in the bottom of tank 12. The slopes of hook 24 and ear 27 accordingly prevent jamming of the mechanism of the device by a careless operator.

A cross bar 33 connects rods 28 below the top of housing 10 and is pivotally connected at its center to a link 34. An idler sprocket wheel 35 is mounted on an axle 36 connected to partition 31 and a drive sprocket 37 is mounted on the axle 38 of a unidirectional electric motor 39 which is mounted in housing 10 on the side of partition 31 remote from tank 12 with its axle extending through partition 31. Sprocket wheels 35 and 37 are in vertical alignment and are preferably equal in diameter, and their centers are separated by a distance substantially greater than their diameter. However, experiments show that diameters of the sprockets may differ without any serious impairment of function. A block chain 40 extends over sprocket wheels 35 and 37 and has one of its elements pivotally connected to link 34 by a pin 41.

Upper and lower normally closed limit switches 42 and 43, respectively, are mounted on partition 31 positioned to be opened by cross bar 33 as it nears the top and bottom respectively of its vertical path. A timer switch knob 43' is mounted in the front wall of housing 10 and is connected by rod 44 to timer switch 44' on the remote side of partition 31. Timer switch 44' is a standard switch available on the market and having switching positions for two circuits. As illustrated in FIGURE 6, timer 44' normally closes switch 45 when the timer dial reads zero time, and as illustrated in FIGURE 5, timer 44' normally opens switch 45 and closes switch 46 when the timer dial reads any positive time. When the knob 43' is moved from zero to any positive time interval, switch 46 is closed and remains closed until the time interval has elapsed when switch 46 opens and switch 45 closes again. Switch 44' may be spring driven or synchronous motor driven. In the latter case, limit switch 43 is replaced by a double throw limit switch 43a the closing of which starts operation of the timing motor 43b as illustrated in FIGURE 7. This provision of a synchronous motor in the timer 44' provides more accurate timing of the cooking cycle, since the timing cycle of timer 44' does not include time necessary to lower basket 21 into the fat bath, but starts the timing cycle when the lower limit switch 43 is opened as the basket reaches the lower limit of its path.

In order to facilitate operation of the device where it is desirable to use it repeatedly for cooking operations requiring the same cooking time, an adjustable stop 47 is provided adjacent timer control knob 43' to permit setting of timer control knob 43' in alignment with a predetermined time setting on the timer dial without looking at the dial. As illustrated in FIGURE 8, the adjustable stop 47 is mounted on a disc 48 rotatably mounted on shaft 44 and provided with a set screw 49 on housing 10 for clamping disc 48 in fixed relation with housing 10. A series of time unit indicators 50 are marked on the periphery of the circular base 43'' of control knob 43', the series cooperating with a reference mark 50' on housing 10 to indicate the position to which knob 43' should be moved to provide the desired cooking interval. The periphery of disc 48 is provided with a similar series 51 of time unit indicators. The adjacent units of series 51 are separated by the same angle, subtended at shaft 44, as are the adjacent units of series 50, and the two series are numbered in the same direction. A stop 51' extends from the edge of base 43'' positioned to contact stop 47 when similar numbers in series 50 and 51 are in alignment. Accordingly, it is apparent that, when disc 48 is adjusted so that the number of series 51 corresponding to the desired cooking time is aligned with mark 50', the operator of the machine can set the knob 43' at the desired cooking time by merely rotating it until stop 51' contacts stop 47.

As illustrated in FIGURES 1–3, a vertical wall 52 is provided between the area under the pan 12 and the working parts of the device in order to prevent fat spilled under pan 12 from fouling the limit switches 42 and 43 in the mechanism for lifting the basket. Wall 52 is preferably made of a steel plate having an aluminum coating to prevent rusting and to provide a more efficient thermal barrier between the pan 12 and electrical wiring.

In operation of the device illustrated in the drawings, the temperature control knob 17 is set for the desired cooking temperature and food to be cooked is placed in basket 21 and the basket is hung on loop 32 in the elevated position as illustrated by the broken lines in FIGURE 1. Timer knob 43' is then set for the desired interval of cooking time. Setting of the timer 44 by knob 43' places the electrical control circuit in the form illustrated in FIGURE 5 where motor 39 is energized through switches 46 and 43 so that cross bar 33 and basket 21 move downwardly until basket 21 is immersed in fat in well 14 when cross bar 33 opens limit switch 43 thus stopping motor 39 while basket 21 remains in well 14 through the desired cooking interval. At the end of the desired cooking interval when timer knob 43' returns to zero time setting thus closing switch 45 and opening switch 46, the control circuit is in the condition shown in FIGURE 6 where motor 39 is energized through switch 45 and limit switch 42. With the motor thus energized, cross bar 33 and basket 21 are raised until basket 21 is above well 14 and cross bar 33 opens limit switch 42 thereby stopping motor 39 until another cooking cycle is initiated by manual operation of timer 44.

In many instances where equipment of the type described above is used, it is desirable to employ a plurality of units of such equipment. Multiple unit installations can of course be made merely by installing a number of the units in a single housing; however, it is more practical to construct a multiple unit machine with a single fat containing tank and a single mechanism for heating the fat in the tank. The machine is then provided with a plurality of baskets and a plurality of independent lift mechanisms for raising and lowering the baskets out of and into the tank. This construction saves the cost of plural heating elements and fat containing pans. When a multiple unit machine is constructed in this manner, the lift mechanism for each of the baskets is positioned adjacent one segment of the wall of the tank, and a basket is carried by each lift mechanism.

One such arrangement is illustrated in FIGURE 9 in which two baskets 21' are mounted in a single fat containing pan with an independent lift mechanism 22' adjacent the side of each basket 21'. Each basket carries a side basket hook 24' cooperating with the lift mechanism support member 32'. Each basket also carries a pair of vertical skid rods 55 on the side thereof positioned to engage a skid bar 56 on the wall of the pan to support the basket in the same way as do the side of basket 21 and rod 25 in FIGURES 1–4.

Figure 10:
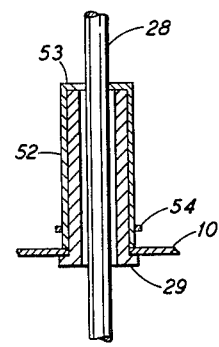
FIGURE 10 is a cross-sectional view similar to FIGURE 4 illustrating an alternative form of apparatus useful in the invention.

By means of substantial testing of the machine described above, a number of improvements in the machine have been devised. One of such improvements is the sealing means illustrated in FIGURE 10 for preventing the passage of oil or fat into the housing of the machine along the lift rods 28. This improved sealing means comprises a sleeve 52 surrounding guideway 29 and having an upper flange 53 thereon which embraces the outer surface of the lift rod 28. The sleeve 52 is secured to guideway 29 by means of a snap ring 54. The internal diameter of flange 53 is a few thousandths of an inch smaller than the diameter of rods 28, sleeve 52 and flange 53 being made of a slightly resilient, low friction material such as Teflon (poly-tetrafluoroethylene manufactured by Du Pont).

Figure 12:
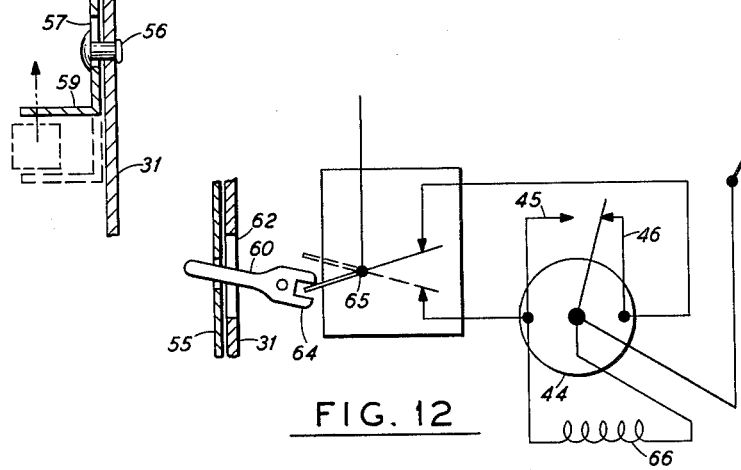
FIGURE 12 is a schematic diagram similar to FIGURE 11 illustrating an alternative form of the control circuit illustrated in FIGURE 11.
Figure 13:
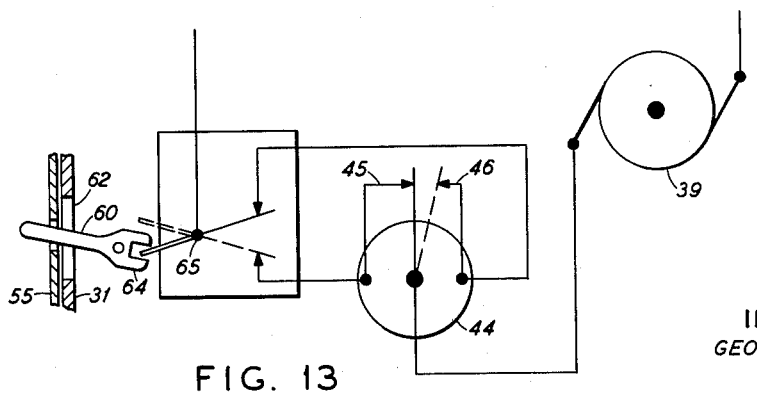
FIGURE 13 is a schematic diagram illustrating the use of the control means of FIGUGRE 11 with the spring driven timer employed in the device illustrated in FIGURE 5.

Another of said improvements is the control means illustrated in FIGURES 11–13 in which the limit switches 42 and 43, illustrated in FIGURE 3 have been replaced by a sliding panel 55 mounted on wall 31 by means of rivets 56 engaged in vertical slots 57 in panel 55. Panel 55 carries upper and lower fingers 58 and 59 respectively positioned to contact cross-bar 33 and move panel 55 responsive to the limits of vertical movement of cross-bar 33. A control trigger arm 60 is pivotally mounted on a bracket 61 on wall 31; bracket 61 may be the bracket employed to mount lift motor 39 in the machine. Arm 60 extends through an elongated slot 62 in wall 31 to engage in a small slot 63 in panel 55. The end of arm 60 is provided with a pair of fingers 64 which operate a double through switch 65. Switch 65 is connected into the motor control circuit as illustrated in FIGURE 11 with the stator coil 66 of a synchronous motor which drives the timer clock connected in parallel with lift motor 39.

An alternate and preferred motor and controls circuit is shown in FIGURE 12, in which case the stator coil 66 is in series with the lift motor 39. In this series connection the lift motor will remain stationary while the timer motor will continue in operation due to the fact that the current passing through the relatively high resistance and impedance of the timer motor is insufficient to start or operate the heavier duty lift motor which is in series connection with 66.

The advantages of the structure of FIGURES 11 and 12 can also be employed where the timer clock 44 is spring driven as illustrated in FIGURE 13 where limit switches 42 and 43 have been replaced by panel 55 and switch 65. The use of panel 55 and single switch 65 involves a savings in materials since only one switch need be used and it provides a more dependable machine because the switch 65 may be mounted behind wall 31 where it is insulated from the fat used in the machine. Fingers 58 and 59 effect vertical sliding of panel 55 as cross-bar 33 approaches the top and bottom of its path, and sliding of panel 55 effects operation of switch 65 by means of arm 60.

It will thus be noted that the deep fat fryer of this invention operates smoothly and automatically to lower food into and raise food out of a deep well filled with cooking fat and that such automatic operation is effected by a single manual manipulation of a timer switch. The device limits splashing of the cooking fat and has no working parts which are easily fouled by splashed fat. The control circuit prevents excessive wear on working parts and positively prevents recurring cooking of the same food by stopping the basket lifting motor when the basket is in its raised and lowered positions.

What is claimed is:

1. An automatic cooking machine comprising a housing having a well in the top thereof, a cooking tank removably mounted in said well, an electrical heating element disposed in the bottom of said tank, a foraminous basket removably disposed in said tank, and means for automatically lowering said basket into said tank and raising said basket out of said tank comprising a frame in said housing slidable along a generally vertical path adjacent one side of said tank and extending above the top of said tank, means for suporting said basket on said frame, a unidirectional electric motor, connecting means connecting said frame to said electric motor and operative to reciprocate said frame along said path when said motor is energized, a first electrical conductor adapted to be connected to a power source, a normally closed limit switch in said first conductor positioned to be opened when said frame is near the bottom of its vertical path, a second electrical conductor adapted to be connected to said power source, a normally closed limit switch in said second conductor positioned to be opened when said frame is near the top of said path, means for connecting one terminal of said motor to a source of electrical power, and a timing switch adapted to connect said first and second conductors alternately to the other terminal of said motor, said timing switch normally connecting said second conductor to said terminal but operative to connect said first conductor to said terminal for a predetermined period of time, said frame comprising two rods slidably mounted in said housing along parallel generally vertical paths adjacent to the side of said tank and extending above the top of said housing, a cross-piece connecting the tops of said rods and extending downwardly therefrom toward said tank, and a cross bar connecting a portion of said rods below the top of said housing, and said means for supporting said basket on said frame comprising a hook extending from said basket and adapted to engage said cross-piece, two generally vertically extending cam surfaces on said basket, and a generally horizontal bearing surface in said tank positioned to contact said cam surfaces.

2. An automatic cooking machine comprising a housing having a well in the top thereof, a cooking tank removably mounted in said well, an electrical heating element disposed in the bottom of said tank, a foraminous basket removably disposed in said tank, and means for automatically lowering said basket into said tank and raising said basket out of said tank comprising a frame in said housing slidable along a generally vertical path adjacent one side of said tank and extending above the top of said tank, means for supporting said basket on said frame, a unidirectional electric motor, connecting means connecting said frame to said electric motor and operative to reciprocate said frame along said path when said motor is energized, a first electrical conductor adapted to be connected to a power source, a normally closed limit switch in said first conductor positioned to be opened when said frame is near the bottom of its vertical path, a second electrical conductor adapted to be connected to said power source, a normally closed limit switch in said second conductor positioned to be opened when said frame is near the top of said path, means for connecting one terminal of said motor to a source of electrical power, and a timing switch adapted to connect said first and second conductors ternately to the other terminal of said motor, said timing switch normally connecting said second conductor to said terminal but operative to connect said first conductor to said terminal for a predetermined period of time, said frame comprising two rods slidably mounted in said housing along parallel generally vertical paths adjacent to the side of said tank and extending above the top of said housing, a cross-piece connecting the tops of said rods and extending downwardly therefrom toward said tank, and a cross bar connecting a portion of said rods below the top of said housing, and said means for supporting said basket on said frame comprising a hook extending from said basket and adapted to engage said cross-piece, two generally vertically extending tubes in said tank between said basket and said rods, a generally horizontal skid bar extending between said tubes, a pair of generally vertical cams on said basket positioned to contact said skid bar, a control box pivotally mounted on the top of said housing on the side of said rods remote from said tank and insulated conductors extending from said control box through said tubes to said heating element.

3. The automatic cooking machine of claim 2 in which said hook slopes downwardly from said basket and away from said basket, and an ear is provided on the side of said basket remote from said hook lying generally parallel to said hook and resting on top of said tank.

4. A cooking machine comprising a housing having a well in the top thereof, a cooking tank removably mounted in said well, an electrical heating element disposed in the bottom of said tank, a foraminous basket removably disposed in said tank and means for lowering said basket into said tank and raising said basket out of said tank comprising a frame in said housing slidable along a generally vertical path adjacent one side of said tank and extending above the top of said tank, means for supporting said basket on said frame, an electric motor, and means for connecting said motor to said frame to reciprocate said frame along said path when said motor is energized, said frame comprising two rods slidably mounted in said housing along parallel generally vertical paths adjacent to the side of said tank and extending above the top of said housing, a cross-piece connecting the tops of said rods and extending downwardly therefrom toward said tank, and a cross bar connecting a portion of said rods below the top of said housing, and said means for supporting said basket on said frame comprising a hook extending from said basket and adapted to engage said cross-piece, two generally vertically extending tubes in said tank between said basket and said rods, a generally horizontal skid bar extending between said tubes and two generally vertical cam surfaces on said basket positioned to contact said skid bar.

5. The cooking machine of claim 4 characterized further by the inclusion of means for preventing the passage of oil between the portion of said rods above said housing and the portion of said rods below the top of said housing.

6. The cooking machine of claim 5 in which said means comprises a sleeve made of a resilient plastic having a low coefficient of friction attached to the top of said housing and having an integral inturned flange resiliently embracing said rods.

7. The cooking machine of claim 4 characterized further by the inclusion of means for moving said hook out of the path of said cross-piece when said basket rests in the bottom of said tank when said cross-piece is being lowered by said motor.

8. The automatic cooking machine of claim 4 in which said hook slopes downwardly from said basket and away from said basket, and an ear is provided on the side of said basket remote from said hook lying generally parallel to said hook and resting on top of said tank.

9. In an automatic deep fat fryer having a tank for containing a bath of heated fat, a foraminous basket removably mounted in said tank for supporting food in said tank during cooking and having a hook on the top thereof adjacent to one side thereof, a yoke adjacent to said tank and engaging said hook for supporting said basket with respect to said tank, and an electric motor connected to said yoke for reciprocating said yoke down and up to lower said basket into said tank and raise said basket out of said tank, the improved means for preventing said basket from being jammed under said yoke when said basket is lowered into said tank before said yoke is moved down by said motor in which: said hook and yoke have upwardly and downwardly facing surfaces respectively for engaging each other with said surfaces defining a cam surface which is inclined at a substantial angle to a horizontal plane, said basket has a horizontal dimension in a vertical plane perpendicular to said cam surface which is less than the horizontal dimension of said tank in said vertical plane, and an ear is provided on said basket on the opposite side thereof from said hook with said ear sloped upwardly away from said basket and positioned to engage an upwardly facing portion of said tank.

10. A cooking machine comprising a housing having a well in the top thereof, a cooking tank removably mounted in the well, an electrical heating element disposed in the bottom of said tank, a foraminous basket removably disposed in the tank and means for lowering said basket into said tank and raising said basket out of said tank comprising a frame in said housing slidable along a generally vertical path adjacent one side of said tank and extending above the top of said tank, means for supporting said basket on said frame, an electric motor, and means for connecting said motor to said frame to reciprocate said frame along said path when said motor is energized, said frame comprising two rods slidably mounted in said housing along generally vertical paths adjacent to the side of said tank and extending above the top of said housing, a cross piece connecting the tops of said rods, and a cross bar connecting a portion of said rods below the top of said housing, and said means for supporting said basket on said frame comprising a hook extending from said basket and adapted to engage said cross piece, a generally horizontal bearing surface in said tank, and two generally vertically extending cam surfaces on said basket positioned to engage said bearing surface.

References Cited by the Examiner

UNITED STATES PATENTS

| | | | |
|---|---|---|---|
| 286,900 | 10/1883 | Burke | 74—37 |
| 913,366 | 2/1909 | Donnelly | 285—302 |
| 1,575,026 | 3/1926 | Wyckoff | 99—336 |
| 2,113,274 | 4/1938 | Lux | 99—403 |
| 2,470,548 | 5/1949 | Desjardins | 99—336 |
| 2,546,464 | 3/1951 | Martin | 99—336 |
| 2,578,971 | 12/1951 | Georgeson | 99—327 |
| 2,656,672 | 10/1953 | Webber | 58—21.13 |
| 2,685,249 | 8/1954 | Badger | 99—403 |
| 2,766,680 | 10/1956 | Tagliaferri | 99—336 X |
| 2,794,897 | 6/1957 | Giles | 99—354 X |
| 2,857,176 | 10/1958 | McTaggart | 285—58 |
| 2,867,164 | 1/1959 | Lutze | 99—403 |
| 2,868,112 | 1/1959 | Bushway | 99—410 |
| 2,875,682 | 3/1959 | Smoot et al. | 99—336 |
| 2,903,958 | 9/1959 | Laurent | 99—336 |
| 2,958,548 | 11/1960 | Vienne et al. | 285—58 |

FOREIGN PATENTS 1,141,056   3/1957   France.

ROBERT E. PULFREY, *Primary Examiner.*

GEORGE A. NINAS, JR., JEROME SCHNALL,
*Examiners.*